United States Patent
Allani et al.

(10) Patent No.: US 6,876,737 B1
(45) Date of Patent: Apr. 5, 2005

(54) PUBLIC INFORMATION TERMINAL

(75) Inventors: Cyrine Allani, Paris (FR); Sédrik Allani, Paris (FR)

(73) Assignee: All Net, Colombes (FR)

( * ) Notice: Subject to any disclaimer, the term of this patent is extended or adjusted under 35 U.S.C. 154(b) by 0 days.

(21) Appl. No.: 09/807,023

(22) PCT Filed: Oct. 8, 1999

(86) PCT No.: PCT/FR99/02423
§ 371 (c)(1),
(2), (4) Date: Apr. 9, 2001

(87) PCT Pub. No.: WO00/22798
PCT Pub. Date: Apr. 20, 2000

(30) Foreign Application Priority Data

Oct. 8, 1998 (FR) .......................................... 98 12633

(51) Int. Cl.[7] .............................................. H04M 1/00
(52) U.S. Cl. ................ 379/220.01; 379/219; 379/93.22
(58) Field of Search ............................ 379/220.01, 219, 379/229, 230, 91.01, 93.01, 93.02, 93.04, 93.22, 93.23, 93.24, 100.04, 100.12; 700/237

(56) References Cited

U.S. PATENT DOCUMENTS 5,761,071 A    6/1998 Bernstein et al.

FOREIGN PATENT DOCUMENTS

| EP | 0 862 151 | 9/1998 |
|----|-----------|--------|
| WO | 97/12479  | 4/1997 |
| WO | 97-14118  | 4/1997 |
| WO | 98/18238  | 4/1998 |

*Primary Examiner*—William J. Deane, Jr.
(74) *Attorney, Agent, or Firm*—Young & Thompson

(57) ABSTRACT

The invention concerns an office automation and communication equipment (1) designed for information exchange, in particular written or oral, via one or several communication networks, for processing data, in particular documents, and for accessing resources available on one or several of said communication networks. Said office automation and communication equipment (1), also known by the name PUBLIDESK (registered trademark in France), is designed to be installed in an existing telephone booth (CA) connected to one of the communication networks, as replacement for a telephone apparatus initially equipping said telephone booth. It is further designed to communicate via the communication network(s) with a central service site designed to manage a set of such office automation and communication equipment installed in an existing network of telephone booths. The invention is particular useful in providing access to Internet and office automation resources form a pool of existing telephone booths.

19 Claims, 4 Drawing Sheets

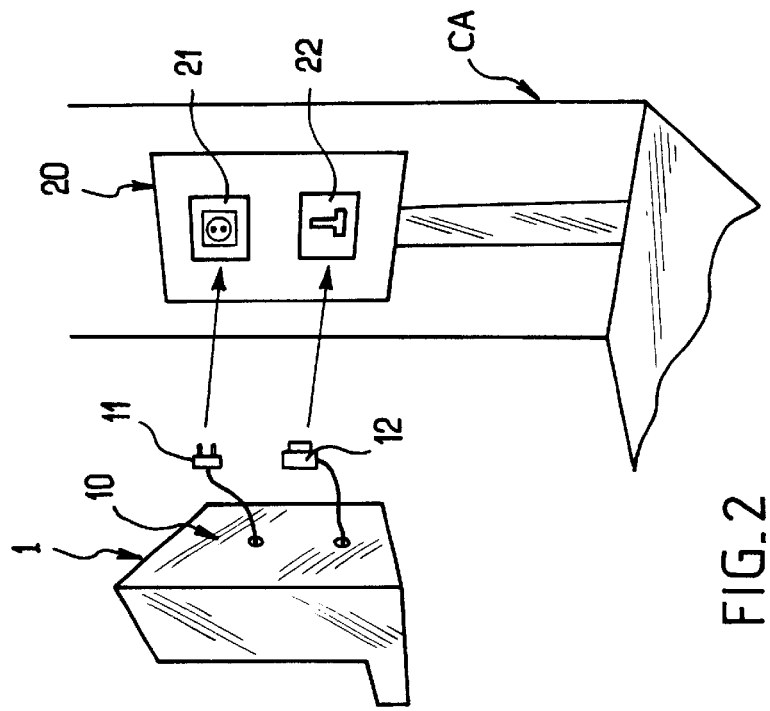
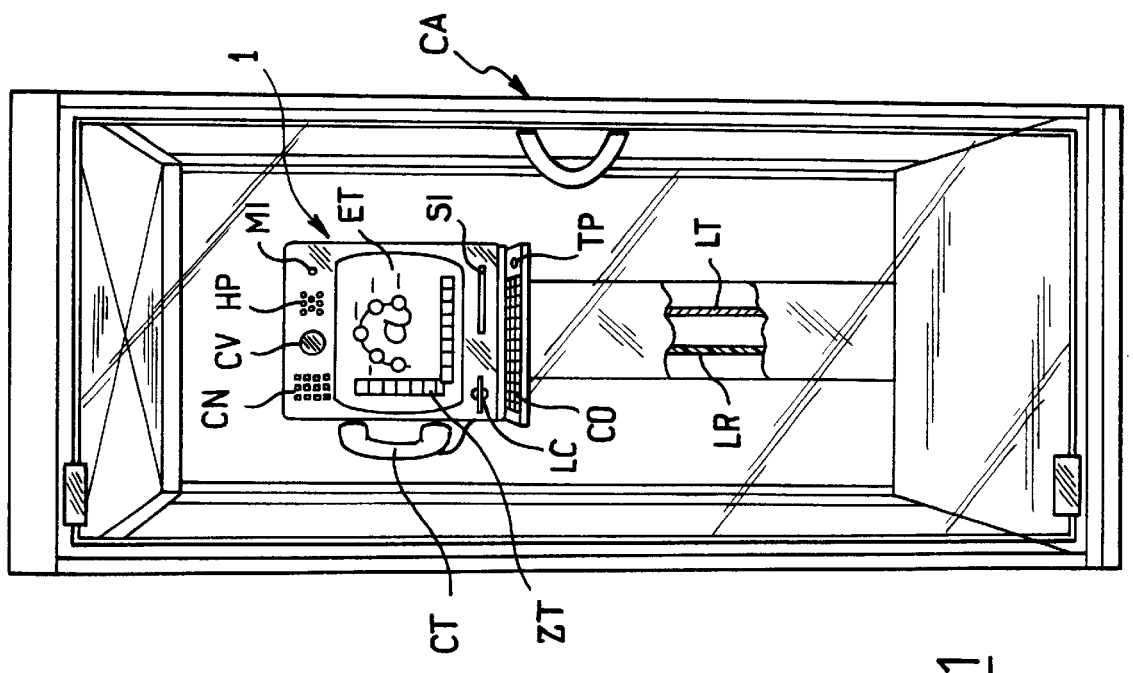
FIG.1
FIG.2

PUBLIC INFORMATION TERMINAL

The present invention relates to an office automation and communication equipment. It also relates to a method and a system for managing a pool of such equipment.

In this context, "office automation and communication equipment" refers to an equipment offering conventional functions encountered in an office such as the processing, display and printing of documents and also communications functions such as facsimile, telephone and access to communications networks and, in particular, to the Internet.

More generally, apparatuses and terminals combining means of communication and means of processing documents, such as personal computers, data processing stations or work stations, equipped with a modem connected to a communications network, are included in the field of office automation and communication equipment.

At present, accessing the Internet network involves the use of microcomputers, which can be personal, family, professional or usable in cyber cafés. Internet consultation stations provided in public places or organisations can also be mentioned. But a major proportion of the population, particularly the young, persons not yet equipped, or travelling persons, find themselves remote from the Internet network.

There are already many examples of realisation of interactive terminals making it possible to access one or more information services. In particular, it is possible to mention terminals providing information of all types (access map, list of hotels, etc . . . ) and terminals making it possible to purchase transport tickets and theatre seats.

Furthermore, stations for accessing and consulting (surfing) the Internet are already available in cyber cafés, administrations and in hotels. These stations are generally microcomputers connected in a local network or provided with a modem. Access to them is controlled by various technical means.

The "Cyberdeck" Internet terminals of the PACIFIC DIGITAL TELECOMS Company are also known. These terminals make use of a man-machine interface called "Cybershell" recorded on a CD-ROM and allowing accessibility to the functions of these terminals and also managing operations and transactions related to the use of smart cards and payment cards. The functions of this type of terminal include, in particular, access to the Web, to electronic mail, to discussion forums, telephony and video-telephony over the Internet, and secure payment. These terminals are provided with universal card readers allowing both secure payments with a bank card and connection to the Internet by means of a charge card. Exclusive cards can be personalised and dispense a predetermined number of units, this allowing control of the overall time of connection. When a user withdraws his card or when his credit is used up, the session terminates and the interface software is reinitialised.

More generally, the Internet access terminals currently available, although they effectively procure access to the Internet service in public places, they are however part of a logic for a simple point of access, subject or not subject to payment, to the Web via an access provider.

Furthermore, their installation in public or private places assumes the installation of a new connection line to the telephone network and the ability to establish a connection to an electricity supply system. The work of installation and the costs resulting from this constitute a real obstacle to the development of these Internet access terminals.

It should be noted that there is known, from the document WO9712479, a communication terminal allowing access to communication networks, to the Internet in particular, and able to be connected to a telephone network in substitution for a telephone set.

Furthermore, beyond the previously stated needs with regard to access to resources available on the Internet, there are also real needs in terms of access to office automation and communications resources, in particular for transmitting, processing and receiving electronic documents and documents on paper medium. This is particularly the case in relations between administrations and public organisations and the administrated entities or users who are frequently confronted with the difficulty of transmitting a supporting document within an appropriate time. It is also possible to mention the case of persons seeking employment who wish to gather a list of offers of employment or to transmit their curriculum vitae to potential employers.

Certainly, facsimile equipment accessible to the public already exists in certain public places such as airports, railway stations or motorway service areas. This facsimile equipment is sometimes coupled or combined with communication equipment such as videotext terminals and telephone sets. But this existing equipment is not however very widely distributed in places of residence or everyday life and cannot be considered as genuine communicating office automation equipment insofar as, on the one hand, they procure only a small proportion of the functions which can justifiably be expected in an office automation installation and, on the other hand, their communication function is singularly limited to operations of transmission of documents by facsimile, telephony and consultation of services.

The purpose of the invention is to remedy this situation by proposing a new concept of office automation and communication equipment making it possible to offer, as a matter of course or in card-related way, a set of usual office automation functions, whilst being widely distributed over all of the territory and therefore accessible to the greatest number of people in places or sites which up to now have not offered points of access to office automation and communicating resources.

This purpose is achieved with an office automation and communication equipment comprising:

means of exchanging information, in particular documents or voice, via one or more communication networks, means of processing information, in particular documents, and means of accessing resources available on one or more of the said communication networks.

This office automation and communication equipment is designed to be installed in an existing telephone booth connected to one of the said communication networks, in substitution for a telephone apparatus initially equipping the said telephone booth.

According to the invention, the means of exchange of information and the means of processing information respectively comprise means for exchanging documents and means for processing documents in electronic form and/or in paper form and this office automation and communication equipment has an internal structure including a communication unit connected to the communication networks, and a central control and processing unit connected on the one hand to the communication unit and on the other hand to the means of exchange and processing documents, this communication unit jointly managing with telephony means in order to maintain a basic telephony function.

Thus, with the office automation and communication equipment according to the invention, installed in existing pools of telephone booths in substitution for public telephones, all or part of the population which had not had direct or easy access to communication and office automation tools, and persons whilst travelling, will henceforth be able to send and receive documents by facsimile, generate, copy, scan, store and print documents, access services and resources on the Internet, send and receive electronic mail, and more particularly, communicate data and images over the system more easily, with the possibility, in particular, of video conferences.

This office automation and communication equipment is also referred to below by the name "PUBLIDESK", which has been the subject of an application to register a trademark in France.

A strong point of this new type of office automation and communication equipment is the fact that it is a matter of making genuine "public offices" available to all, whilst minimising the infrastructure costs since use is made of public telephone booths as local installation sites for this office automation and communication equipment which is consequently advantageously installed in the populated districts and places in the centres of towns and villages, rather like the public letter-writers of former times.

Furthermore, it is important to note that the present invention can have a significant positive economic impact for telecommunications operators currently using telephone booths, insofar as it makes it possible to give a new lease of life to the existing pool of public telephone booths the use of which is in constant decline in direct relationship with the growth in the mobile telephone market.

Furthermore, a telecommunications operator transforming its pool of booths equipped with public telephones into a pool of booths receiving office automation and communication equipment should benefit from a positive image with consumers and with the population in general insofar as it is thus establishing a public service meeting real and identified communication and multimedia needs by making available to all, and in particular to the excluded, a modern form of public office offering a combination of services which is at present difficult to find in the centres of towns and villages.

In a preferred version of the invention, the office automation and communication equipment furthermore comprises means of selectively controlling access to the information exchange means, to the processing means and/or to the means of access to resources available on one or more of the said communication networks.

Furthermore, the office automation and communication equipment according to the invention preferably comprises means for making a direct electrical connection with an electrical installation equipping the telephone booth receiving this office automation and communication equipment, and means for making a direct communication connection with a communication installation equipping this telephone booth.

It is also advantageous to ensure that the office automation and communication equipment or PUBLIDESK according to the invention should furthermore comprise means for making a direct mechanical connection with a mechanical support within the telephone booth receiving this office automation and communication equipment.

The means of access to on-line resources advantageously cooperate with the cental management means and with the communication means in order to provide an access portal to a plurality of services.

In a particular operational configuration, an office automation and communication equipment according to the invention or PUBLIDESK can advantageously include means of providing an electrical energy supply service for portable computer and/or telecommunications equipment. Access to this electrical energy supply service can be subject to the holding of access rights contained, for example in a memory card or to the use of a charge card.

This particular configuration is principally but not exclusively aimed at the user segment formed by businessmen, salesmen, consultants and professional persons for whom this offer of services meets a widely felt need. Booths of this type could advantageously be installed inside business centres, in railway stations and in airports.

In another particular operational configuration which is generally complementary to the previously mentioned configuration, the office automation and communication equipment according to the invention can also include means of providing a service for the connection of portable computer and/or telecommunications equipment to one or more of the said communication means.

Access to the means of supply of energy and of connection service can be controlled for example by controlled mechanical obturating means or even electronically.

In a representative example of utilisation, an office automation and communication equipment according to the invention or PUBLIDESK is designed to procure selective access to one or more predetermined services available on one or more of the communications networks to a holder of a portable data medium, such as a memory card, containing data representative of selective access rights allocated to that holder.

According to another aspect of the invention, a method is proposed for managing a set of office automation and communication equipments according to the invention, these office automation and communication equipments being installed in public telephone booths in substitution for public telephones initially equipping these booths, characterised in that it is designed to manage the communications and exchanges of data involving each of the said office automation and communication equipments via one or more of the communication networks.

According to another aspect of the invention, a method is proposed for managing a set of office automation and communication equipments according to the invention, these office automation and communication equipments being installed in public telephone booths in substitution for public telephones initially equipping these booths, characterized in that it is designed to procure, for each of the office automation and communication equipments, access to resources available on one or more of the communications networks, and in particular on the Internet network. It is also possible to ensure that this management method procures for each of the office automation and communication equipments an access portal to a plurality of service providing sites, and for it to be able to manage charging for the management services of the pool of public telephone booths thus equipped, based for example on a measurement of the flows of communication and information and data exchanges involving the set of office automation and communication equipments installed in this pool of public telephone booths.

According to yet another aspect of the invention, a system is proposed for managing, from a management site connected to one of the communication networks to which this network of booths is connected, a set of office automation and communication equipments according to the invention, these office automation and communication equipments being installed in a network of public telephone booths in substitution for public telephones initially equipping these booths, characterized in that it comprises means of procuring for each of the said office automation and communication equipments access to resources available on one or more communication networks and in particular on the internet network.

Other features and advantages of the invention will furthermore become apparent in the following description. In the appended drawings, given by way of non-limitative examples:

FIG. 1 shows a public telecommunication booth equipped with an office automation and communication equipment according to the invention, or PUBLIDESK;

FIG. 2 shows an example of connection of an office automation and communication equipment according to the invention in a telephone booth;

FIG. 6 shows an example of flow of information in a particular implementation of the management method according to the invention.

Figure 3:
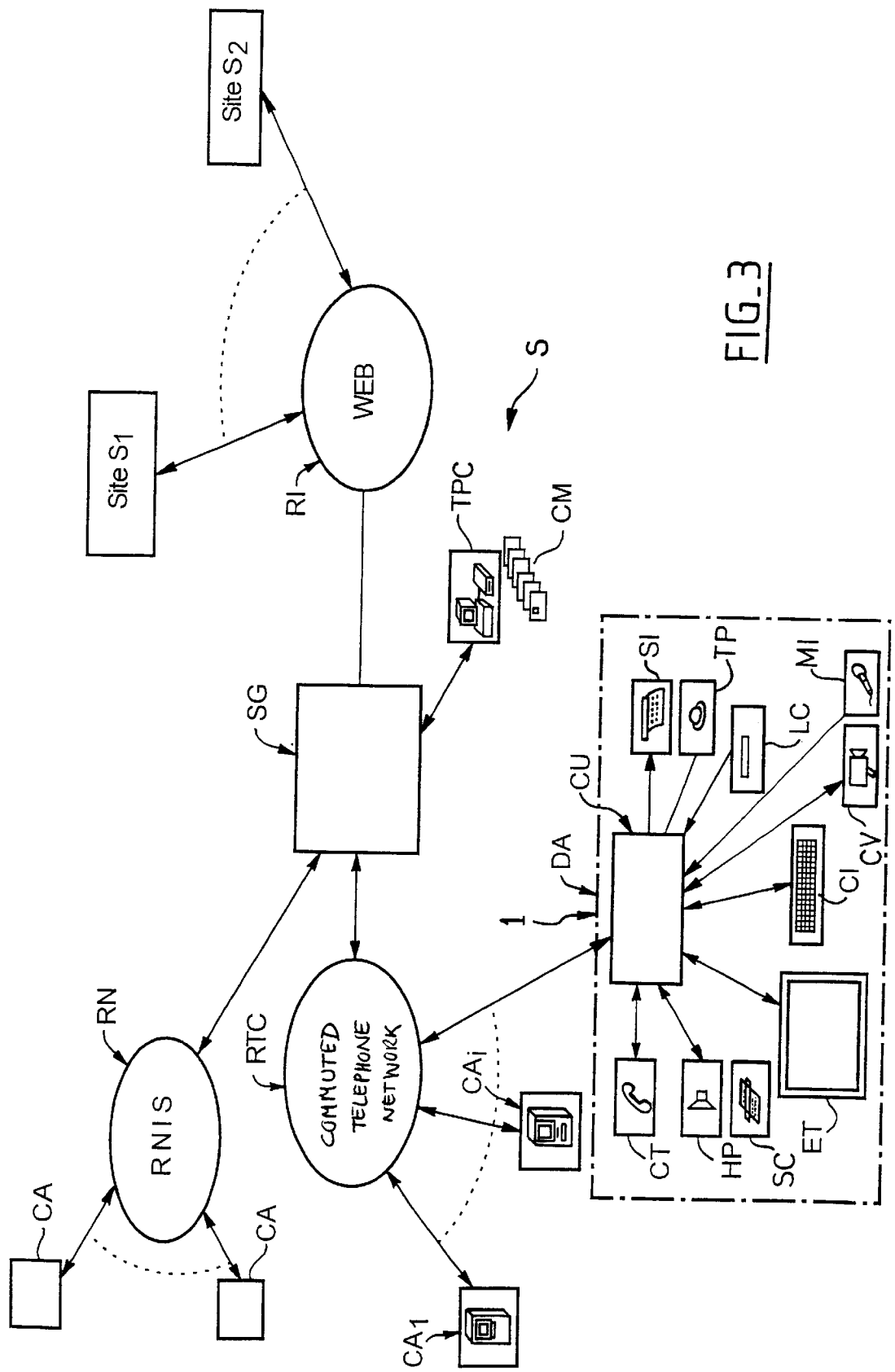
FIG. 3 is a block diagram showing a management system of a pool of office automation and communication equipments according to the invention.

An example embodiment of an office automation and communication equipment according to the invention or PUBLIDESK installed in a public telecommunication booth will now be described with reference to FIG. 1.

Within the scope of the present invention, a telecommunications booth CA of conventional structure equipped to normally receive a telephone device, is equipped with an office automation and communication equipment 1 according to the invention, which is fixed for example to a fixing plate on a technical stand normally provided for fixing a public telephone.

The office automation and communication equipment or PUBLIDESK 1 comprises for this purpose a rear face provided with fixing elements designed and positioned in order to allow a simple and rapid attachment to the fixing plate.

The office automation and communication equipment 1 enclosed in a casing designed to resist shocks and deterioration comprises, by way of non-limitative example, on its front face, a display screen ET, which can be of conventional or touch-sensitive type, a keyboard CO of conventional or touch-sensitive type, a smart card reader LC provided for controlling access to the communications networks, a printer output SI, a loud speaker HP, a pointing and selection equipment TP of the "track pad" type, a telephone handset CT and a dialling keypad CN.

It is obvious that numerous other supplementary equipments can be provided for this office automation and communication equipment, for example a video conference camera CV, a loudspeaker HP, a microphone MI or a touch-sensitive keyboard 2T integrated with the screen, or even a digitising equipment (scanner).

The office automation and communication equipment 1 according to the invention is installed instead and in place of a conventional telephone device and uses for this purpose the existing telephone link LT and electrical power supply link LR of the host booth CA. The connections of the office automation and communication equipment 1 to a basic support 20 of the public booth CR can be achieved very simply, with reference to FIG. 2, by connecting, on the one hand, a male electrical power supply plug 11 coming from the rear face 10 of the equipment 1 to an electrical power supply socket 21 provided on the support 21 and, on the other hand, a telecommunications connector 12 with a telecommunications socket 22 also provided on the basic support 21.

The internal structure of the office automation and communication equipment 1 includes a communication unit connected by an appropriate connection system to the public telephone network, and central control and processing unit card to which are connected the touch-sensitive screen ET, the external keyboard CO, the card reader LC, and all of the other peripherals of this equipment.

The central processing unit card is provided with a storage unit, for example of the CD-ROM type, provided for storing a resident software product having the following functions:

management of the internal equipment of the terminal, management of the access control, display of welcome pages.

The management system of a pool of office automation and communication equipments S according to the invention comprises, with reference to FIG. 3:

a dedicated server SG centralising all of the data accessible from the booths CA1, . . . , Cai, CA, personalised smart cards CM containing for example the following data: identifier, curriculum vitae in the case of job seekers, personalised rights of access, electronic mail address, one or more terminals TPC for personalising these cards.

The telecommunications booths CA according to the invention can be connected to the management server SG either by a switched telephone network RTC, or by an Integrated Services Digital Network RN, or by any other type of communications network.

The management server SG is connected to a second communications network RI, for example the Internet network, to which service sites S1, . . . , SN such as employment agency sites or estate agency sites are connected.

An example of utilisation of an office automation and communication equipment according to the invention or PUBLIDESK installed in a public booth will now be described. A user is invited by a welcome page to access the Internet network by inserting a transaction card CM, for example a telephone card, a dedicated card (employment, accommodation, etc . . . ), a charge card, a credit card or any other card, for example a multi-service card.

For holders of personalised smart cards, numerous types of service will be proposed, among which are, by way of non-limitative example:

a "job application" card, giving its holder access only to sites contained in the "employment" icon (for example, ANPE, ANPE international, APEC, temporary work companies);

a "student" card giving access to information of interest to the student world, such as examination or competition results, preliminary registrations at Universities, consultation of study programmes of French or foreign universities, or timetable consultations;

a "businessman" card allowing access to hotel lists, transport companies or to connectors built into the terminal according to the invention for recharging a portable computer and to benefit from all of the office automation functions (sending a facsimile, sending and reading electronic mail, word processing, spreadsheet, etc . . . ).

Figure 4:
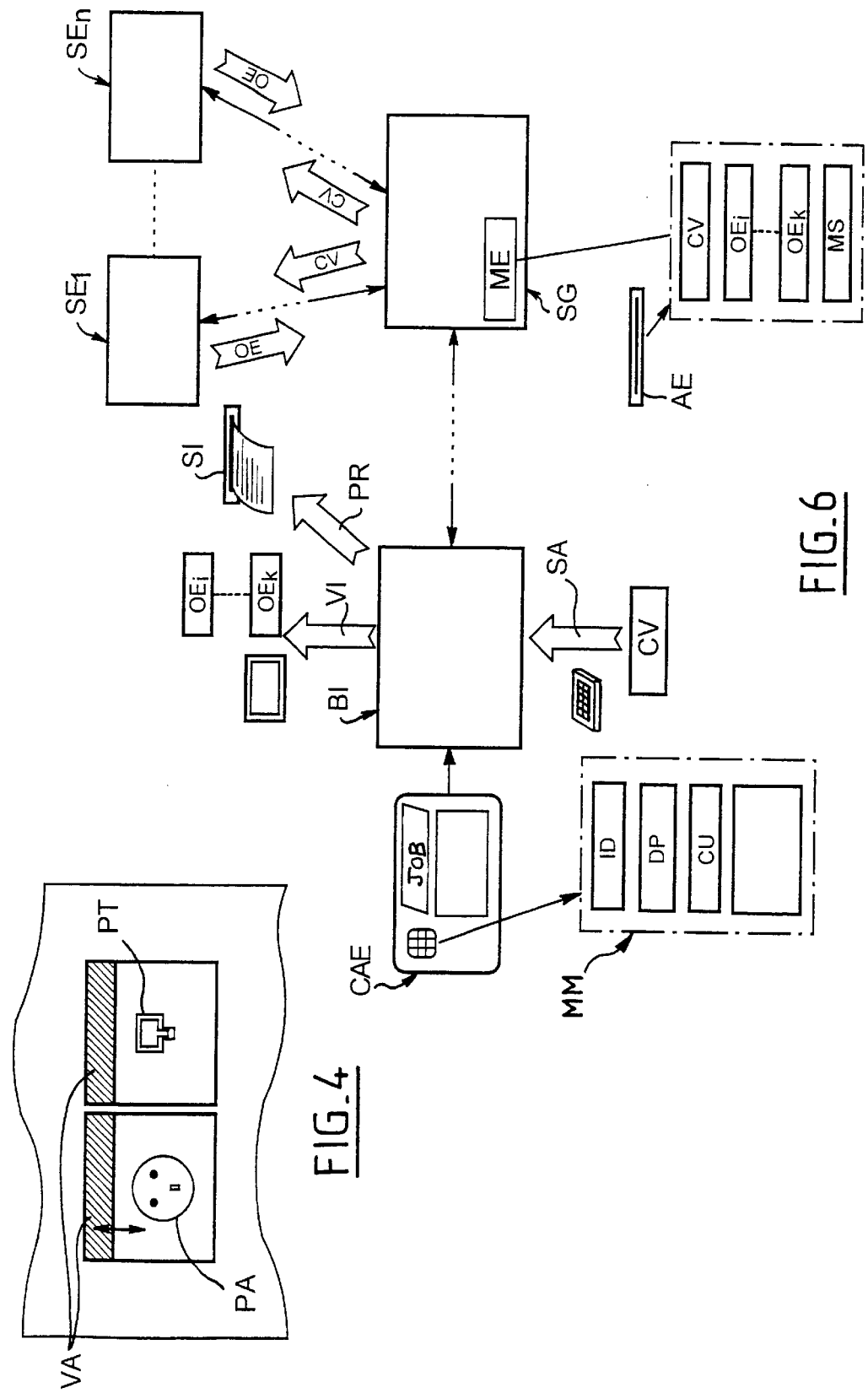
FIG. 4 shows optional equipments of an office automation and communication equipment according to the invention.

The telephone booths equipped with a particular version of an office automation and communication equipment according to the invention designed for offering the latter set of functions are provided with an electrical power supply connector PA and a standardised connection socket PT, access to which is controlled, either mechanically by means of removable shutters VA, or electronically, as illustrated in FIG. 4.

It should be noted that the said types of card offer their holders the possibility of creating their own electronic mail addresses and of consulting them at any time.

A main menu offered by an office automation and communication equipment according to the invention constitutes the first page visible on the screen of this booth and presents the information which can be consulted. For purposes of clarity and ease of use, this menu must comprise only a limited number, for example not more than twelve, of icons of generic type such as "national education", "transport", "employment", "theatres", "employment abroad", "foreign universities", "surf the Web" and "shopping". These icons are mentioned by way of non-limitative example and can be varied according to the site of installation.

It is also possible to provide for the display of a scrolling menu in order to engage the interest of a user coming initially just for telephoning. The main menu can, for example, offer, by means of icons, generic headings such as those mentioned above.

Once the card is inserted, the user can have access only to the sites authorised by his card and it thus channelled in his searches, thereby saving valuable time. Depending on the rights which have been allocated to him, this user will be able to explore the totality of a specified site, surf the Web or connect his portable computer and continue working.

In the case of booths located in protected or semi-protected places, it is possible for example to provide a cyclic log scrolling when the office automation and communication equipment is in the rest state. The icons contained in the main menu are adaptable to the welcome site of the booth which will offer different information if it is a matter of a university, an employment agency or a café: for example, in a university, a student can consult his timetable, choose those tasks directed for the following year, consult his marks, be in contact with foreign universities in order to carry out a study session, have access to offers of employment, play, etc.

In particular, it is possible to design, within the scope of the present invention, a telecommunications booth which would be dedicated to a particular service, for example a service offering employment or one offering accommodation, in addition to the provision of the public telephone service.

The software used in an office automation and communication equipment according to the invention allows, by means of a simple and user-friendly tree structure, fast access to the information offered in the icons of the main menu. This equipment is designed to receive downloads and to participate in automatic data gathering at predetermined times for various updates on the central site. It is also designed to manage countermand and payment lists.

Figure 5:
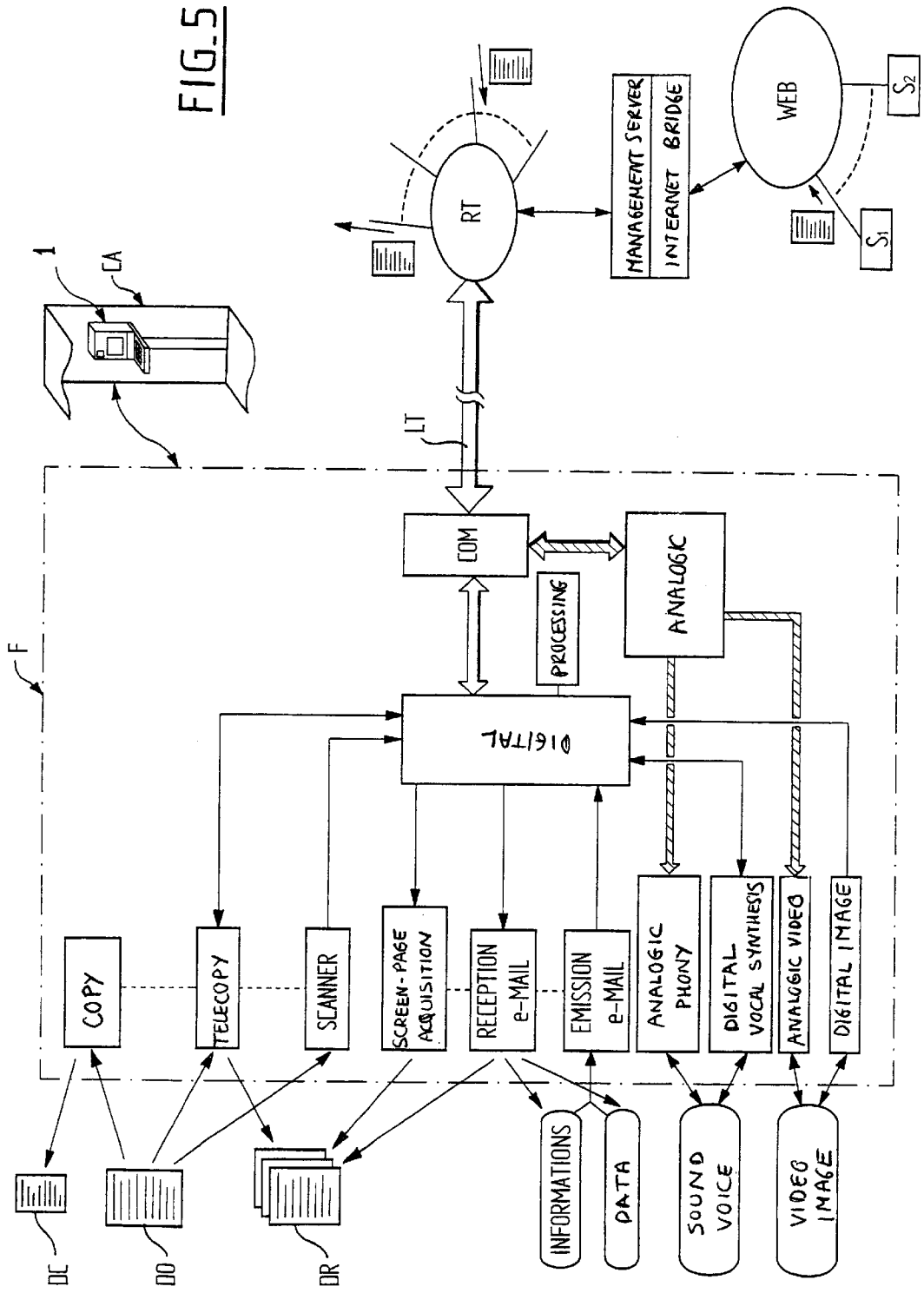
FIG. 5 shows a set of functions offered in an office automation and communication equipment.

An office automation and communication equipment 1 according to the invention or PUBLIDESK, installed in a public booth CA simply connected by a telephone line LT to a telecommunications network RT procures, in addition to the basic telephone functions offered initially by public telephones, a complete set of office automation and document processing functions F, as shown in FIG. 5. It is thus possible to obtain, from an original document DO, a copy DC, a facsimile, a digitisation (scanner) and a transmission by electronic mail (e-mail). In the opposite direction, a user of this equipment can receive documents by facsimile, by electronic mail and can print screen pages consulted whilst surfing on the Web. In addition to documents in paper form, the user can also transmit and receive information and data in electronic form from an office automation and communication equipment according to the invention which is provided with means of connection for a computer or means of reading digital information media. This information and data, which can furthermore be acquired or completed using the keyboard of the office automation and communication equipment, can then be transmitted by electronic mail.

Besides the basic telephone function, which is maintained within the office automation and communication equipment according to the invention, functions for the digital transmission of sound and images are offered to users, in particular for carrying out video conferences.

Depending on the nature of the documents exchanged or collected, the latter are subjected, within an office automation and communication equipment according to the invention, either to a digital type processing, or to analogue processing, and are then all transmitted, after passing through a communication module, through the channel of the sole telecommunication link LT, either to facsimile machines via one or more telecommunication networks, or to external sites via a gateway on the Web, possibly controlled by the management site. In the opposite direction, all of the documents converging on an office automation and communication equipment, either in the form of facsimiles or in the form of electronic documents, enter through the channel of the sole telecommunication link LT and then are processed internally either in analogue form or in the digital form in order to be delivered by printing or by display on the screen.

The software implemented in an office automation and communication equipment according to the invention can include, for example, an operating system, a text editor, an Internet browser, an Internet electronic mail manager, a facsimile manager and an anti-virus module.

It is possible to provide a common design for all of the sectors of utilisation of an office automation and communication equipment according to the invention, which can be broken down into modules according to requirements: wall fixing, technical stand, office automation and communication equipment placed on a table, various casings depending on the places of installation.

The activity sectors accessible from a telephone booth according to the invention can be diversified: employment, culture, teaching, health, tourism, entertainment, transport, etc.

The office automation and communication equipment according to the invention or PUBLIDESK must be of minimum bulk and meet the general principles of equipments made available to the public, particularly in terms of a sealed keyboard, a touch-sensitive screen, telephone equipment, strong materials, indicating notices and recognisable design.

There will now be described, with reference to FIG. 6, a non-limitative example of implementation and utilisation of an office automation and communication equipment according to invention installed in a public booth, for employment seeking services.

A user, who holds an "employment" card CAE which has been issued to him by an organisation or a company, is considered. The memory MM of this card includes, in particular, identification data ID of the holder, data DP representative of the access rights associated with that card (for example, URL addresses of sites which can be consulted) and a credit CU of telephone units.

The welcome page displayed immediately on utilisation of the office automation and communication equipment and after insertion of the access control card CAE in the reader LC includes an "employment" icon. By simply pressing a finger on the corresponding area of the touch-sensitive screen this icon opens and gives access to a tree structure offering several choices.

For example:

| Employment | → Apec |
| | → ANPE |
| | → Manpower ® |
| | → Adecco ® |
| | → Others . . . |

(for example, the possibility of entering the electronic address of the company or of being guided in one's search by proposals of field of activity, location, etc).

The user can also submit his curriculum-vitae on-line by entering SA on the touch-sensitive keyboard of the office automation and communication equipment, display (VI) on the screen the pertinent offers of employment OEi, . . . , OEk, print (PR) the addresses of the companies to which he has sent his CV as well as the content of the advertisements. Whilst surfing from the booth, he has the possibility of creating his electronic address AE in order to benefit from electronic mail ME in order to consult his messages and the answers to his employment applications.

For each user having created an electronic address, the management server SG retains the CV of that user, possibly the offers of employment which he has selected and the answer messages MS coming from employment-offering sites or from employers who have issued offers OE.

Several methods of managing a pool of office automation and communication equipment according to the invention can be envisaged within the framework of the present invention.

In a first method of management, a telecommunications operator possessing or controlling an existing pool of telephone booths acquires a set of office automation and communication equipments according to the invention, installs them in the telephone booths in substitution for public telephones, and directly manages these office automation and communication equipments, receiving fees from the users for access to telephone and data processing resources or being remunerated by the services provided to users who then pay only for calls at the local rate or who can even have free access to the telephone services.

In a second method of management, a telecommunications operator possessing or controlling a pool of public telephone booths entrusts to a utilizer of the method according to the invention, all of the operations of substitution (removal of the existing public telephones, installation and connection of the office automation and communication equipments) and of management and maintenance of the equipments, which are then the property of the utilizer or which are entrusted to the latter for management.

The telecommunications operator can be remunerated on the one hand with the communications generated and paid for by the users from the set of office automation and communication equipments and, on the to other hand, according to the utilisation of the various peripherals of the office automation equipments, for example in relation to the number of prints made.

The operator can also be remunerated with a predetermined percentage of the financial flows generated by the utilisation of the office automation and communication equipments according to the invention, for example on the basis of payments by the users for the services provided, or even on the basis of publicity fees received by the utilizer.

This second management method has the advantage for the telecommunications operator of not requiring investment in new public hardware nor expenses of replacement, maintenance and upkeep, and of not involving responsibility for operational management.

The invention is not of course limited to the examples which have just been described and many modifications could be applied to these examples without departing from the scope of the invention. Thus, the office automation and communication equipments according to the invention or PUBLIDESK may assume any external forms whatsoever. The components used for the embodiment of the various display, entry and communication functions can of course evolve over time as demanded by technical advances in this field. Furthermore, the field of application of the present invention is not limited to a particular communication network or to a given pool of telephone booths.

What is claimed is:

1. Method of managing access to a set of service resources (S1, S2) available on at least one communication network (RT, RI, RN) from access equipment installed at telephone booths located in at least semi-public places, comprising the steps of:

identifying a set of service resources on a communication network;

identifying a telephone network equipped with existing telephone sets located in telephone booths at least semi-public places;

providing, at a management site, a management server means connected to the communication network and to the telephone network;

substituting the existing telephone sets with access equipment able to connect with the management server means, and via the management server means and the communication network, able to connect with the resources; and operating the management server means to control access by users of the access equipment to the resources on the communication network.

2. Method according to claim 1, wherein the substituting step comprises a step of connecting the access equipment, able to access the resources available on the communication network, onto a telephone connection (22) existing on said telephone booth.

3. Method according to claim 1, wherein the substituting step comprises a step of fixing the access equipment, able to access the resources available on the communication network, onto a fixing plate (20) designed for fixing a telephone set device.

4. Method according to claim 1, wherein the substituting step comprises a step of connecting the access equipment, able to access the resources available on the communication network, onto an electrical energy supply connection (22) existing on said telephone booth.

5. A system for managing access to a set of service resources, available on at least one communication network, from a set of at least semi-public places, comprising:

a management server means located at a management site and connected to at least one communication network and to a telephone network, wherein, the management server is connectable to an identified set of service resources connected to the at least one communication network, the telephone network is quipped with existing telephone sets located in telephone booths of at least semi-public places, at some of the telephone booths, the existing telephone sets having been substituted with access equipment able to connect with the management server means, and via the management server means and the communication network, able to connect with the resources, and the management server means is configured to operate to control access by users of the access equipment to the resources on the communication network.

6. The system of claim 5, further comprising:

a telephone booth connected to the telephone network, the telephone booth comprising one of the access equipment substituted for the telephone set, the access equipment including control means to selectively controlling access to the management server of the management site, and the control means further including means of payment or charging.

7. The system of claim 4, wherein the access equipment further provides telephone service.

8. The system of claim 6, wherein the access equipment further comprises:

a central control and processing unit (CU);

the central control and processing unit (CU) controlling energy control means (PA, PT) for controlling an electrical energy supply service for at least one of portable computer and a telecommunication equipment; and an access module for controlling access to the processing unit, the access module requiring, for access operation, one of a memory card with access rights and a charge card.

9. The system of claim 8, the access equipment further comprising:

a controlled obturating means controlled by the central control and the processing unit, the obturating means controlling the access to the energy control means for controlling the energy supply service, the obturating means being mechanical or electronic.

10. The system of claim 6, the acess equipment further comprising:

a central control and processing unit (CU), the central control and processing unit controlling a service connection control means (PT) for controlling a communication service connection to the at least one communication network, the communication service connection providing connectivity for at least one of a portable computer and a telecommunications equipment to the at least one communication network.

11. The system of claim 10, wherein, the service connection control means (PT) is controlled by a mechanical or electronic obturating means, the obturating means being controlled by the central control and processing unit.

12. The system of claim 5, further comprising:

access equipment in the form of an access device interchangeable in substitution with one telephone set, the access device comprising control means (LC) to selectively controlling access to the management server of the management site, and means of payment or charging.

13. The system of claim 12, wherein, the access device further comprises an interface for a memory card containing data representing access rights selectively assigned to a specific user, the access rights provided by the memory card allowing the access device to be managed by the management server for managing access to selected ones of the resources.

14. The system of claim 12, wherein, the access device further comprises means providing telephony service.

15. The system of claim 14, wherein, the telephone network is a telephone commuted network (RTC), and the means for providing telephony services is designed providing said telephony service with the telephone commuted network.

16. The system of claim 14, wherein, the at least communication network is the Internet, and the means providing telephony service is designed for providing said telephony service through the Internet.

17. An office automation and communication equipment system, comprising:

office communication equipment;

a telecommunications booth with mounting connections suitable for both of a telephone set and the office automation and communication equipment (1);

the office automation and communication equipment removably mountable to the mounting connections for activation to a telephone network, the telephone set removably mounted to the mounting connections for activation to the telephone network to provide telephony service, with the office automation and communication equipment being installed instead and in place of the telephone set, the telecommunication booth is configured as an Internet access point;

a management server located at a management site, the management service connecting the telephone network to the Internet, the management server providing the office automation and communication equipment, installed at the telecommunication booth, with controlled access to identified service resources connected to the Internet;

the office automation and communication equipment being activated with personalized smart cards containing data from the set consisting of a user identifier, a curriculum vitae, personalised rights of access, and an electronic mail address, wherein, the telecommunications booth can be electronically connected to the management server by the telephone network, the management server is connected, via the Internet, to service resources including employment agency sites and real estate agency sites, the data on the smart card interact with the management server to present access rights to the management server so that the management server selectively connects the user of the smart card interacting with the office automation and communication equipment, installed at the telephone booth, with corresponding ones of the service resources.

18. The system of claim 17, wherein the telephone network is an ISDN network.

19. The system of claim 17, wherein the smart card provides access to an employment site and the office automation and communication equipment provides the user with an employment form for completion.

* * * * *